United States Patent [19]

Herman

[11] Patent Number: 5,394,195
[45] Date of Patent: Feb. 28, 1995

[54] METHOD AND APPARATUS FOR PERFORMING DYNAMIC GAMMA CONTRAST CONTROL

[75] Inventor: Stephen Herman, Monsey, N.Y.

[73] Assignee: Philips Electronics North America Corporation, New York, N.Y.

[21] Appl. No.: 76,565

[22] Filed: Jun. 14, 1993

[51] Int. Cl.$^6$ .............................................. H04N 9/69
[52] U.S. Cl. ..................... 348/675; 348/676
[58] Field of Search ............... 358/164, 32; 348/674, 348/675, 676, 677; H04N 9/69, 5/203, 5/20

[56] References Cited

U.S. PATENT DOCUMENTS 4,489,349 12/1984 Okada ................................. 358/168

FOREIGN PATENT DOCUMENTS 0278137 12/1992 European Pat. Off. .

OTHER PUBLICATIONS

"Real-time local adaptivevideo processing in diagnostic imaging", Hier et al. SPIE, vol. 535 Application of Optical Instrumentation in Medicine XIII 1985, pp. 298–301.
"Real-Time Adaptive Contrast Enhancement", Narendra et al., IEEE Transactions On Pattern Analysis And Machine Intelligence, vol. PAMI-3, No. 6, Nov., 1981, pp. 655–661.

Primary Examiner—James J. Groody
Assistant Examiner—David E. Harvey
Attorney, Agent, or Firm—Edward W. Goodman

[57] ABSTRACT

Ordinarily, television signals are subjected to gamma correction at the source to compensate for non-linearities in CRT-based displays in accordance with set standards. However, it has been found in practice that all CRT-based displays do not exhibit the same amount of non-linearity. Hence, some television receivers include gamma correction circuitry which compensate for the difference between the particular CRT display and that assumed by the transmission system standard. In addition the above, circuitry is added for adapting this correction to local areas on the display thereby achieving dynamic range equalization. The input video signal is first low-pass filtered and then subjected to a normalization between 0.0 and a first predefined maximum value A. A second predefined value B is then added to this normalized signal generating a gamma exponential. At the same time, the input video signal is normalized for the range 0.0 and 1.0. This normalized input signal is then raised to an exponential power equivalent to the gamma exponential. Finally, this resultant signal is re-scaled back to the dynamic range of the input video signal. The resultant video signal on display then has the dark portions thereof more visible without the bright parts looking washed out.

10 Claims, 5 Drawing Sheets

METHOD AND APPARATUS FOR PERFORMING DYNAMIC GAMMA CONTRAST CONTROL

BACKGROUND OF THE INVENTION

1. Field of The Invention

The subject invention relates to controlling the contrast in a television receiver.

2. Description of The Related Art

Presently, the contrast of television displays is controlled in four ways. The first two are user controls which the user sets based on his/her own preferences. The last two are built into the television receiver by the manufacturer. These four controls include:

(1) The "Contrast" control on the television receiver varies the gain of the display; increasing the gain increases contrast. However, too much gain can cause clipping of the image highlights.

(2) The "Brightness" control adjusts the DC level of the blackest part of the image. Increasing the brightness control does give the sensation of a brighter image, but at the cost of lower color saturation and lower contrast.

(3) "Gamma correction" is usually built in by the manufacturer. CRT-based displays have a non-linear relationship between the applied signal voltage and the resulting image intensity. Gamma correction seeks to compensate for the distortions caused by such non-linearities by pre-distorting the signal in the opposite direction. This linearization of the image often improves image contrast. It is possible to provide additional low-level contrast by increasing the gamma correction.

(4) "Edge enhancement" steepens the transitions in the signal at detected edges which enhances the visibility of features in an image.

These conventional methods of contrast control are normally applied to the entire image uniformly. Since the dynamic range of displays is limited, it is not possible to simultaneously perceive small variations in image intensity, i.e. small details, in the bright and dark regions simultaneously.

SUMMARY OF THE INVENTION

It is an object of the present invention to increase image dynamic range and feature visibility of a video signal on display.

It is a further object of the invention to provide local dynamic gamma contrast control that allows contrast to be adapted to the local brightness level in each region of each image frame thereby making the dark portions of the image more visible without making the bright parts look washed out.

The above objects are achieved in a method of providing dynamic gamma contrast control of a video signal, characterized in that the method comprises the steps of low-pass filtering the input video signal so that processing only occurs on the low frequency components therein, normalizing, pixel-by-pixel, the low-pass filtered video signal so that the value thereof extends from 0 to a predetermined maximum value A, thereby forming a normalized signal, adding a predetermined parameter B to the normalized signal thereby forming a gamma exponent, normalizing the input video signal so that the values thereof lie between 0 and 1.0, raising the normalized video signal, pixel-by-pixel, to an exponential power equal to the gamma exponent forming a corrected normalized video signal, and rescaling the corrected normalized video signal to the full dynamic range of the input video signal.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

The SMPTE standards assume that a TV display will be a CRT having a gamma of 2.2. That is, the light output I, as a function of the input video signal voltage V is given by:

$$I_{out} = V^{2.2} \quad (1)$$

To compensate for this assumed output distortion, all standard video cameras and other sources have a built-in gamma correction of 1/2.2=0.45. That is, the output voltage of the camera as a function of the input light level is:

$$V_{out} = I_{in}^{0.45} \quad (2)$$

The CRTs in today's receivers typically have gammas from 2.2 to 2.8, depending on the CRT being used. Therefore, it is often recommended that at the receiver, some additional gamma correction should be done. If the video source is originally corrected to a gamma of 2.2, and the display CRT has a gamma of 2.8, then it may be desirable to re-correct the video data to 2.8 at the receiver. The input and output voltages of the receiver gamma corrector have the relationship:

$$V_{out} = V_{in}^{2.2/2.8} = V_{in}^{0.786} \quad (3)$$

Raising the input voltage to some exponent lower than unity before display often increases the overall brightness and the contrast of details in the dark part of the image.

The method described above is what is currently performed in television receivers. The subject invention extends this method of contrast enhancement by adapting it locally.

Figure 1:
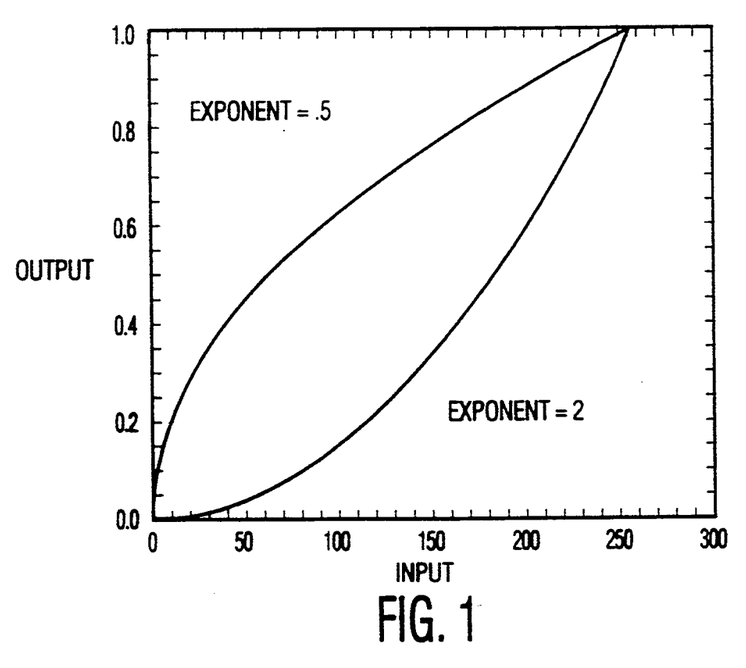
FIG. 1 is a graph showing the input-output characteristics of a normalized signal raised to both the 0.5 and 2.0 exponential powers.

FIG. 1 shows the input-output relationships when the input voltage (normalized to unity) is raised to the exponent 0.5 and the exponent 2.0. The exponent of 0.5 provides gain for the low input signal values and saturation, or de-emphasis, of the high signal values. Conversely, the exponent of 2.0 attenuates low signal values and accentuates high signal values. Using this principle, local gamma correction is applied with the following adjustment to the video signal:

1. Convert the input composite signal to R, G, B components using well known methods;
2. Derive a luminance-like two-dimensional signal g(x,y) defined at each pixel location as the maximum of the three signals R, G and B at that pixel;
3. low-pass filter the signal g(x,y) to yield $g_{low}(x,y)$;
4. Normalize the low-pass filtered video signal so that its values extend, for example, from 0 to A and add a second parameter B, as follows:

$$h(x,y) = \{g_{low}(x,y) * A / \text{maximum}(g_{low}(x,y))\} + B \quad (4)$$

5. Normalize the original video signal so that its values range from 0.0 to 1.0, expressed as $g_{norm}(x,y)$.
6. At every pixel of step 5, raise the normalized video signal value to an exponential power having the value given in step 4. Thus the output of the processing would be:

$$g_{out}(x,y)^{h(x,y)} \quad (5)$$

7. Re-scale $g_{out}(x,y)$ to the full dynamic range of the input video signal.

Figure 2:
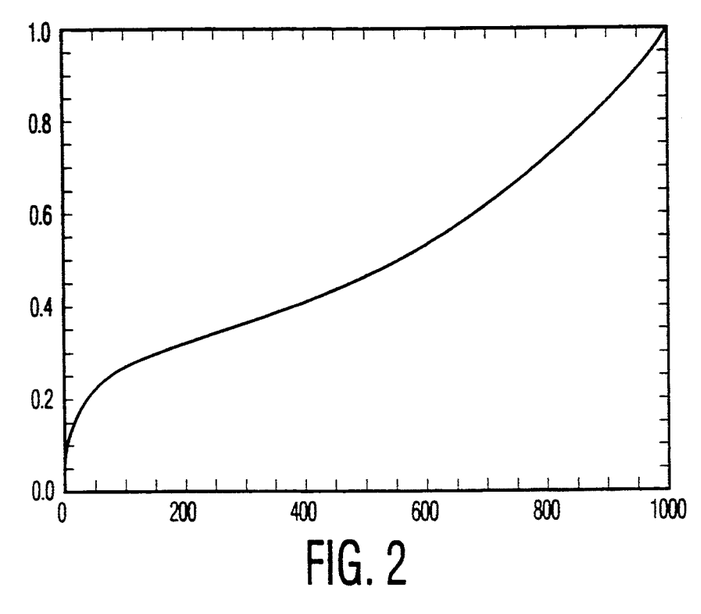
FIG. 2 is a graph showing the low frequency input-output characteristics of a video signal when subjected to the gamma correction of the subject invention.

It has been found that A should fall in the range of 1.2 and 2.5, while B should fall in the range of 0.1 to 0.9. Preferably, A should equal 1.34, while B should equal 0.45. For these values, the input-output curve is shown at FIG. 2. It can be seen that the gain (the slope of the curve in FIG. 2) is highest at low input values, goes to a minimum at mid range (around 400-600 on the arbitrary scale of the graph in FIG. 2), and rises again at high values.

Figure 3:
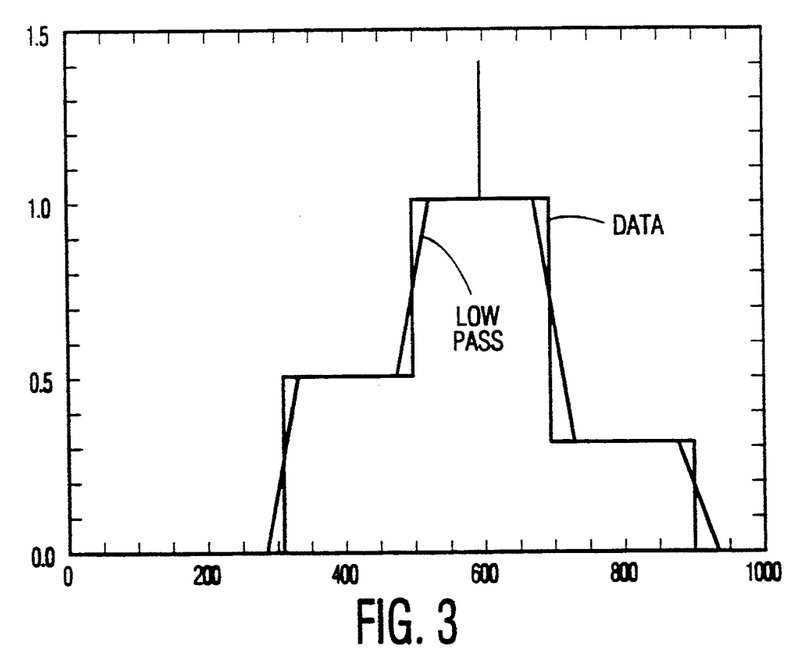
FIG. 3 is a graph showing a simulated line signal and the effects of low-pass filtering thereon.
Figure 4:
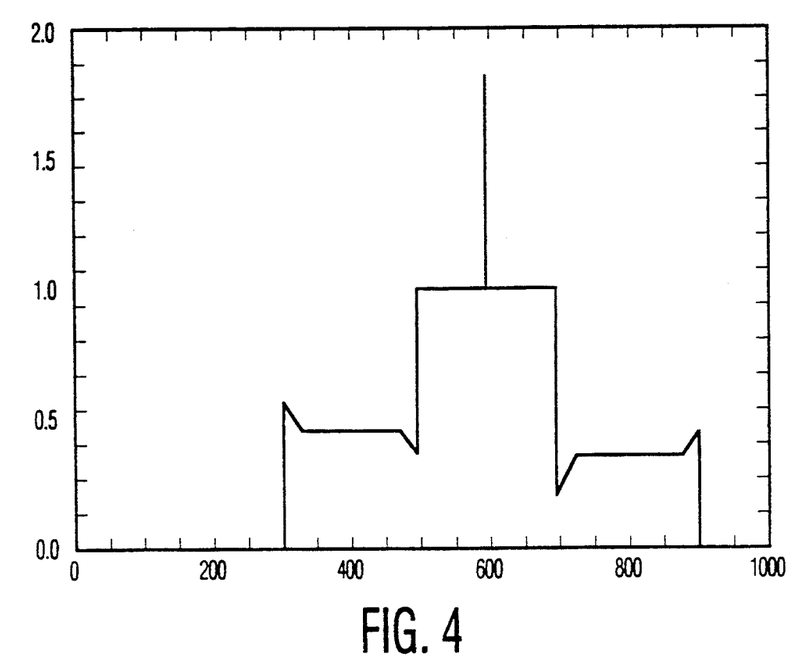
FIG. 4 is a graph of the simulated line signal in which the overshoot and undershoot of the simulated line signal caused by the processing where the gamma is a function of the low-pass filtering.

Such an input-output transfer curve does provide significant enhancement at low intensity values. However, by itself, it would provide a very "washed-out" look at other intensity ranges, especially at mid-range. The dynamic range compression of the subject invention only provides a psychophysically pleasing result due to the edge enhancement that the method automatically provides. To illustrate the edge enhancement, an arbitrary simulated image scan line is shown in FIG. 3. The signal is shown with a solid line. Its low-pass filtered version is shown superimposed as a dotted waveform. It was derived by convolving the original waveform by a rectangular window of size 50. The processing consists of raising the solid curve to an exponential power given by the dotted curve, all properly scaled, as described above. Low values of this exponent give high gain. Increasing values of the exponent give decreasing gain. Consider what happens at the first transition of the solid waveform from 0.0 to 0.5. At the instant of this transition, the dotted exponent lags behind, providing a high gain. Then, as the dotted curve "catches up" to the solid curve, its value stabilizes at a lower gain. The resulting overshoot is shown at the first edge in FIG. 4. These overshoots and undershoots provide the edge enhancement that is crucial for the method of the subject invention to work properly. The size of the convoluting window for the low-pass filter is a parameter of the method. Typical values for a normal NTSC image sampled at 14.3 MHz rates, ranges from 20 to about 40. Preferably, the video signal is convolved by a square window of uniform unit weight and size 31-by-31 for an NTSC video signal sampled at 14.3 MHz.

Figure 5:
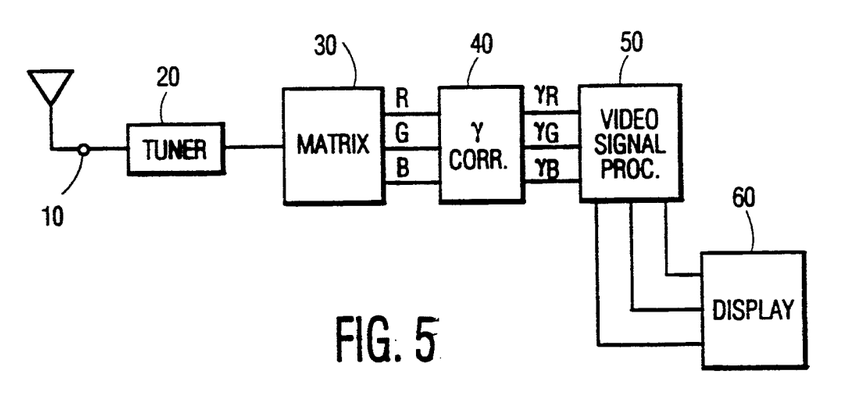
FIG. 5 is a block diagram of a television receiver having a gamma correction circuit therein.

FIG. 5 shows a block diagram of a television receiver. The television receiver includes an antenna input 10 for receiving television signals. The antenna input 10 is connected to a tuner circuit 20 for tuning to and receiving a particular television signal. An output from the tuner circuit 20 carrying a baseband composite video signal is applied to an input of a matrix circuit 30 for deriving the separate color signals R, G and B. These color signals are subjected to gamma correction as controlled by gamma correction circuit 40. The gamma corrected signals are then applied to a video signal processing circuit 50 for further processing and are then applied to a display 60 for displaying the resulting video images.

Figure 6:
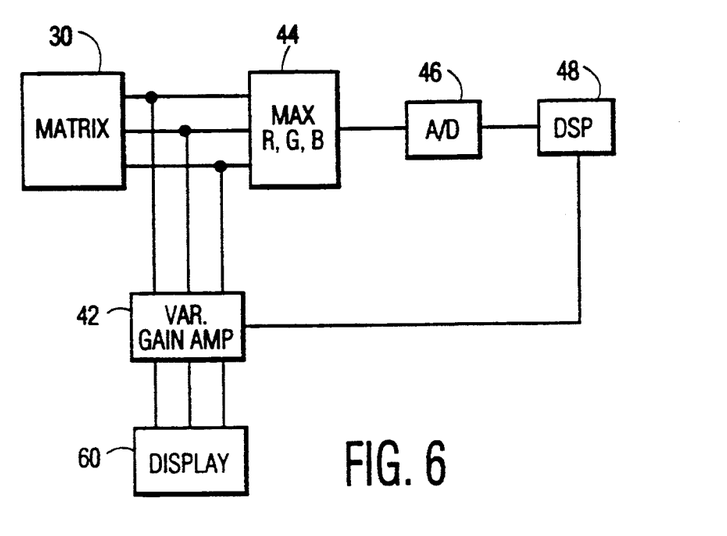
FIG. 6 is a block diagram of a first basic embodiment of a dynamic gamma contrast control circuit of the subject invention.

FIG. 6 shows a block diagram of, in part, the gamma correction circuit of FIG. 5. The R, G, B outputs from the matrix circuit 30 are applied to, on the one hand, the inputs of a variable gain amplifier arrangement 42, and, on the other hand, to a maximum determining circuit 44 for determining, pixel-by-pixel, the maximum of the three signals. An output $V_1$ of this maximum determining circuit 44 is subjected to analog-to-digital to-digital conversion in A/D 46 and is then applied to an input of digital signal processing (DSP) circuit 48. This DSP circuit 48 determines, pixel-by-pixel, the value $V_2/V_1$, where $$V_2 = V_1^{(k1 + k2\overline{V}_1)} \quad (6)$$

where $\overline{V}_1$ is the average of $V_1(x,y)$ over the moving rectangular window, k2 equals A, and k1 equals B.

This output is applied to a control input of the variable gain amplifier arrangement 42 for varying the gain thereof in accordance with the subject invention. The output from the variable gain amplifier arrangement 42 is then applied to the display 60 (via the video signal processing circuit 50).

Figure 7:
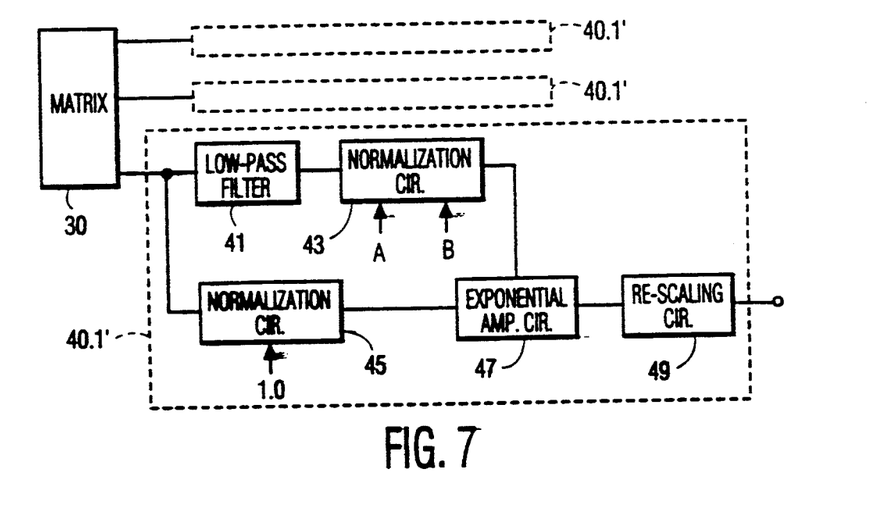
FIG. 7 is a block diagram of a second basic embodiment of a dynamic gamma contrast control circuit of the subject invention.

FIG. 7 shows an alternate embodiment to that shown in FIG. 6. In particular, each of the color signals is processed independently, FIG. 7 showing in detail the circuitry 40.1' for processing only one of the color signals, the other two color signals being processed similarly. The output from the matrix circuit 30 is applied to a low-pass filter 41. An output of the low-pass filter 41 is applied to a first normalization circuit 43 to which is applied the parameters A and B. This first normalization circuit 43 performs the calculation of Equation (4). The output from the matrix circuit 30 is also applied to a second normalization circuit 45. An output of the second normalization circuit 45 is applied to an exponential amplification circuit 47 which receives as its exponential input, the output from the first normalization circuit 43 and which performs the calculation of Equation (5). An output from the exponential amplification circuit 47 is then applied to a re-scaling circuit 49 for re-scaling the input signal thereto back to the full dynamic range of the input video signal. An output from this re-scaling circuit 49 is then applied to the display 60 via the video signal processing circuit 50.

The use of the algorithm given in Equations (4) and (5) amplify low-level noise to an objectionable amount. This is due to the fact that the slope of Equation (5) is the gain at any given signal level. When g(x,y) approaches zero, the gain approaches infinity. The result is that the noise in the region of zero signal is amplified to a large extent. One approach is to modify Equation (5) so that it does not approach zero for small signals. Many arbitrary modifications could be used. The main requirement is that the slope of the system characteristic (Equation (5)) should not approach large values. To that end:

$$g(x,y) = r(g_1(x,y),c) = ln\{cg(x,y) + sqrt(cg_1(x,y))2 + 1\} \quad (7)$$

where sqrt denotes the square root operation, and "2" refers to the squaring operation. Using this Equation (7), Equation (5) should be revised as follows:

$$g_{out}(x,y) = r(g_{norm}(x,y),c) * \{g_{norm}(x,y)\}^{h1(x,y)/(r(1,c))} \quad (8)$$

where $$h1(x,y) = g_{low}(x,y) * A / \text{maximum}(g_{low}(x,y)) \quad (9)$$

as defined in Equation (4)

The implementation of Equation (8) requires that a time and space varying function be raised to a power that itself is a function of time and space. This is somewhat difficult and expensive to implement in consumer-level equipment. Therefore, an approximation is made in which n, m and p are set to be three numbers such that if $n = m^p$, then $$n = m^p = (1 + (m-1))^p = 1 + p(m-1) + \ldots \quad (10)$$

In Equation (10), the first two terms of a standard power-series expansion are taken. Theoretically, these first two terms are only sufficient to approximate the actual function in the limit as m→1. However, in the current application, Applicant has discovered empirically that the coarse approximation of Equation (10) is a very adequate substitute for the normal exponentiation operation of Equation (8). The pictures produced by the approximation are virtually indistinguishable from the pictures produced by the actual exponential function. It allows the exponentiation to be replaced by two multiply operations. Thus Equation (8) becomes:

$$g_{out}(x,y) = r(g_{norm}(x,y),c) * \{1 + g_{norm}(x,y) * (h(x,y) - 1)\}/(r(1,c)) \quad (11)$$

Now, understanding that the enhancement of the subject invention began with $g_{norm}(x,y)$, the "luminance" like signal at each pixel location, the output of Equation (11) is $g_{out}(x,y)$ at these location. Hence, the ratio of the output to the input is defined as:

$$z(x,y) = g_{out}(x,y) / g_{in}(x,y) \quad (12)$$

This results in the output R, G, B values being:

$$R_{out}(x,y) = R_{in}(x,y) z(x,y) \quad (13)$$

$$G_{out}(x,y) = G_{in}(x,y) z(x,y) \quad (14)$$

$$B_{out}(x,y) = B_{in}(x,y) z(x,y) \quad (15)$$

These signals may be applied in the usual manner to a display.

Figure 8:
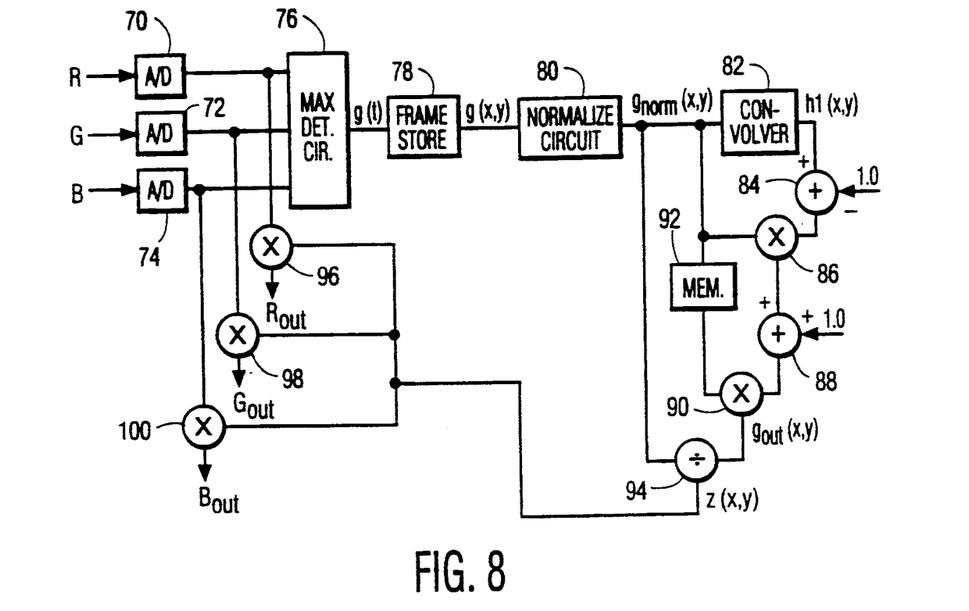
FIG. 8 is a block diagram of a first preferred embodiment of a dynamic gamma contrast control circuit of the subject invention having a digital implementation.

FIG. 8 shows a block diagram of a preferred embodiment of a digital implementation of the invention for use in a television receiver. After R, G, B signals are derived from the source of composite video signals, the R, G, B signals are digitized in analog-to-digital converters (ADC) 70, 72 and 74 forming the signals $R_{in}$, $G_{in}$, $B_{in}$. At each sampling instant, these signals are converted to a single "luminance" like signal g(t) by replacing them by the maximum of $R_{in}$, $G_{in}$, $B_{in}$ at each location in maximum determining circuit 76. At each sampling instant, the resultant signal g(t) is stored in a frame store 78. The output from the frame store 78 is then normalized in a normalization circuit 80 giving the output signal which ranges from 0.0 to 1.0. The output from the normalization circuit 80 is applied to a convolver 82 which performs a two-dimensional averaging of $g_{norm}(x,y)$ and, after suitable rescaling as shown in Equation (9), outputs the signal $h_1$ (x,y). The level of this signal is shifted by subtracting 1.0 from it in the subtractor 84. The output from the subtractor 84 is multiplied by the input of convolver 82, $g_{norm}$ (x,y), in a multiplier 86. The level in this signal is then shifted by adding 1.0 to it in adder 88, the output therefrom being then applied to one input of a second multiplier 90. In addition, $g_{norm}(x,y)$ is applied as an address signal to a look-up table, which is in the form of a read-only memory 92. This look-up table performs the r function as defined in Equation (7), the output from which is applied to the other input of the second multiplier 90. The output from this second multiplier 90 $g_{out}$ (x,y) is then applied to the dividend input of divider 94 which receives the divisor input from the output of the normalization circuit 80. The output z(x,y) from the divider 94 is applied to the first inputs of respective multipliers 96, 98 and 100 which receive the signals $R_{in}$, $G_{in}$, $B_{in}$ from the outputs of the ADC's 70, 72 and 74, thereby forming the signals $R_{out}$, $G_{out}$, $B_{out}$, respectively, as in Equations (13)–(15).

For reasons of economy, it would be preferable to have a low-cost analog implementation of the present algorithm. The main difficulty with a direct implementation of Equation (11) is to find a method of producing, with real-time analog systems, $g_{low}(x,y)$, the two-dimensional low-pass filtered version of the input $g_{in}$ (x,y). This problem is solved in the following manner.

Let g(t) be the one-dimensional, raster scanned representation of the two-dimensional scene g(x,y). The assumption is to generate the real-timed analog version of g(x,y) low-pass filtered by convolving with a uniform kernel of size 30×30. In an NTSC system, g(t) is band-limited to 4.3 MHz. g(t) is then passed through a conventional analog low-pass filter of bandwidth 4.3/30 MHz. If the normal sampling rate for the original video signal was 14.3 MHz, the output of the low-pass filtered signal can be adequately sampled at a 14.3/30 MHz rate. That would yield approximately 25 samples per horizontal video line. A kernel size of 30 vertical lines per frame equals 15 vertical lines per field. Therefore, 15×25=375 samples adequately represent all of the information inside the 30×30 kernel for any one field. Therefore, use is made of analog samplers working at 14.3/30 MHz=477 KHz. The resulting analog samples are stored in an analog FIFO delay line such as those based on CCDs. Then, an analog adder with 15 inputs is used to produce the output voltage that is proportional to the desired two-dimensional low-pass filtered output.

Figure 9:
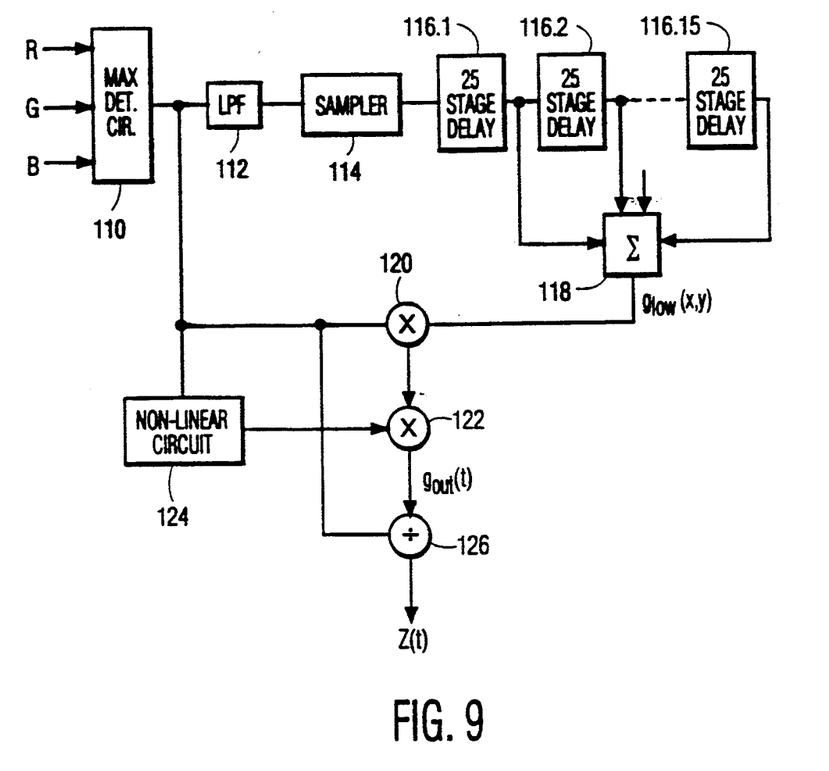
FIG. 9 is a block diagram of a second preferred embodiment of a dynamic gamma contrast control circuit of the subject invention having an analog implementation.

FIG. 9 shows a preferred embodiment of an analog implementation of the invention also for use in a television receiver. An analog maximum determining circuit 110 forms the signal g(t) from the R, G, B signals applied to the inputs thereof. This output signal is applied to a low-pass filter 112, which has a bandwidth of 1/30 of the original 4.3 MHz video bandwidth, and then to an analog sampling circuit 114 which samples $g_{low}$(x,y) at the rate of 14.3/30 MHz=477 KHz, resulting in 25 samples per video line. The output from the sampling circuit 114 is applied to an analog delay line 116 having 15 stages (116.1–116.15), each stage 116.n including 25 single sample delay elements. The outputs from all of the stages 116.n are applied to a summing circuit 118 for implementing the two-dimensional averaging. This signal is applied to one input of a first multiplier 120 which receives at its other input g(t) at the output of the maximum determining circuit 110. The output of the first multiplier 120 is applied to a first input of a second multiplier 122. g(t), after being processed by a nonlinear circuit 124, is then applied to the second input of the second multiplier 122. The output from the second multiplier 122 is applied to the dividend input of divider 126 which receives g(t) at its divisor input. The output from the divider 126 is the function z(t) which is used to individually multiply the analog input functions R, G, B (not shown). It should be understood that this analog embodiment also requires DC shifts similar to those shown in FIG. 8 at adders 84 and 88.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A method of providing dynamic gamma contrast control of an input video signal in a television receiver, said input video signal forming, on display, image frames, each of which exhibits varying brightness in differing areas of the respective image frame, comprising the steps:

low-pass filtering the input video signal so that processing only occurs on the low frequency components therein;

normalizing, pixel-by-pixel, the low-pass filtered video signal so that the value thereof extends from 0 to a predetermined maximum value A, thereby forming a normalized signal;

adding a predetermined parameter B to the normalized signal thereby forming a gamma exponent;

normalizing the input video signal so that the values thereof lie between 0 and 1.0;

raising the normalized video signal, pixel-by-pixel, to an exponent equal to the gamma exponent forming a corrected normalized video signal; and rescaling the corrected normalized video signal to the full dynamic range of the input video signal, whereby dark portions of the image frames formed when said corrected normalized video signal is displayed are more visible than in the image frames of said input video signal.

2. A method of providing dynamic gamma contrast control of a video signal as claimed in claim 1, wherein A is chosen in the range 1.2 and 2.5.

3. A method of providing dynamic gamma contrast control of a video signal as claimed in claim 2, wherein A is 1.34.

4. A method of providing dynamic gamma contrast control of a video signal as claimed in claim 1, wherein B is chosen from the range of values 0.1 and 0.9.

5. A method of providing dynamic gamma contrast control of a video signal as claimed in claim 4, wherein B is 0.45.

6. A method of providing dynamic gamma contrast control of a video signal as claimed in claim 1, wherein said low-pass filtering of the video signal comprises convolving the video signal with a square window of uniform unit weight and size 31-by-31.

7. A method of providing dynamic gamma contrast control of a video signal as claimed in claim 1, wherein said video signal is a color video signal and said method is performed on each of the R, G and B components in the color video signal individually.

8. A circuit for providing dynamic gamma contrast control of a video signal in a television receiver, said input video signal forming, on display, image frames, each of which exhibits varying brightness in differing areas of the respective image frame, said circuit comprising:

an input for receiving an input video signal;

means for low-pass filtering said input video signal;

means for normalizing said low-pass filtered video signal between the range of 0.0 and a first predetermined quantity A, providing a normalized output signal;

means for adding a second predetermined quantity B to said normalized output signal, forming a gamma exponential signal;

means coupled to said input for normalizing said input video signal between the range of 0.0 and 1.0;

means for raising said normalized video signal by a quantity indicated by said gamma exponential signal, forming a corrected normalized video signal; and means for re-scaling said corrected normalized video signal back to the full dynamic range of the input video signal, whereby dark portions of the image frames formed when said corrected normalized video signal is displayed are more visible than in the image frames of said input video signal.

9. A digital circuit for providing dynamic gamma contrast control of a video signal in a television receiver, said input video signal forming, on display, image frames, each of which exhibits varying brightness in differing areas of the respective image frame, said circuit comprising:

input means for receiving input R, G, B signals;

means for digitizing said input R, G, B signals forming $R_{in}$, $G_{in}$, $B_{in}$ signals;

means for determining, pixel-by-pixel, a maximum of said $R_{in}$, $G_{in}$, $B_{in}$ signals thereby forming a signal g(t);

storing means for storing the signal g(t);

means coupled to an output of said storing means for normalizing g(t) forming an output signal $g_{norm}$(x,y) which ranges in value from 0.0 to 1.0;

convolving means for performing a two-dimensional averaging and rescaling on $g_{norm}$(x,y) thereby forming the signal $h_1$(x,y) in accordance with the equation $$h1(x,y) = g_{low}(x,y) * A / \mathrm{maximum}(g_{low}(x,y)),$$

where A is a constant selected from the range 1.2 to 2.5;
subtracting means for subtracting 1.0 from $h_1(x,y)$;
a first multiplier for multiplying an output of the subtracting means by $g_{norm}(x,y)$;
adding means for adding 1.0 to an output of said first multiplier;
a look-up table for receiving the signal $g_{norm}(x,y)$ and for implementing a function r in accordance with the equation $$g_2(x,y)=r(g_1(x,y),c)=ln\{cg_1(x,y)+\sqrt{(cg_1(x,y))^2+1}\}$$

where c is a constant selected from the range 2.0 to 15.0;
a second multiplier coupled to the output of the adding means and the look-up table forming the signal $g_{out}(x,y)$;
a divider coupled to an output of the second multiplier and an output of the normalizing means for forming the factor $z(x,y)$ in accordance with the equation $$z(x,y)=g_{out}(x,y)/g_{norm}(x,y); \text{ and}$$

multipliers coupled respectively to outputs of said digitizing means and each receiving the function $z(x,y)$ thereby forming the output signals $R_{out}$, $B_{out}$, $G_{out}$, whereby dark portions of the image frames formed when said output signals are displayed are more visible than dark portions in the image frames of said input video signal.

10. An analog circuit for providing dynamic gamma contrast control of a video signal in a television receiver, said input video signal forming, on display, image frames, each of which exhibits varying brightness in differing areas of the respective image frame, said circuit comprising:
an input for receiving input R, G, B signals;
means for determining a maximum, pixel-by-pixel of the input: R, G, B signals forming the signal $g(t)$;
means for low-pass filtering the signal $g(t)$;
means for sampling an output of the low-pass filtering means;
delaying means for delaying an output of said sampling means, said delaying means having a plurality of stages each of which having an output;
means for summing the outputs from said plurality of stages in said delaying means;
a first multiplier having a first input coupled to the output of said summing means and a second input coupled to the output of said maximum determining means;
a nonlinear circuit having an input coupled to the output of said maximum determining means;
a second multiplier having a first input coupled to an output of said first multiplier and a second input coupled to an output of said nonlinear circuit;
a divider coupled to an output of said second multiplier and the output of said maximum determining means for forming the function $z(x,y)$; and
means for receiving the input R, G, B signals and for multiplying these signals by the function $z(x,y)$, whereby dark portions of the image frames formed when said input R, G, B signals multiplied by the function $z(x,y)$ are displayed are more visible than dark portions in the image frames of said input video signal.

* * * * *